US008401343B2

(12) United States Patent
Braun

(10) Patent No.: US 8,401,343 B2
(45) Date of Patent: Mar. 19, 2013

(54) SYSTEM AND METHOD FOR DEFINING AN AUGMENTED REALITY CHARACTER IN COMPUTER GENERATED VIRTUAL REALITY USING CODED STICKERS

(76) Inventor: Edwin Braun, Victoria (CA)

( * ) Notice: Subject to any disclaimer, the term of this patent is extended or adjusted under 35 U.S.C. 154(b) by 0 days.

(21) Appl. No.: 13/430,499

(22) Filed: Mar. 26, 2012

(65) Prior Publication Data
US 2012/0244939 A1  Sep. 27, 2012

Related U.S. Application Data

(60) Provisional application No. 61/468,027, filed on Mar. 27, 2011.

(51) Int. Cl.
*G06K 9/54* (2006.01)
(52) U.S. Cl. .......................... 382/306; 705/10
(58) Field of Classification Search .................. 382/306; 705/10; 463/31–42; 345/98
See application file for complete search history.

(56) References Cited

U.S. PATENT DOCUMENTS

| | | | |
|---|---|---|---|
| 7,817,816 B2 * | 10/2010 | Wang et al. | 382/100 |
| 2007/0042165 A1 * | 2/2007 | Wang et al. | 428/204 |
| 2007/0222734 A1 * | 9/2007 | Tran | 345/98 |
| 2008/0279481 A1 * | 11/2008 | Ando | 382/306 |
| 2010/0191578 A1 * | 7/2010 | Tran et al. | 705/10 |
| 2011/0261389 A1 * | 10/2011 | Ohara | 358/1.15 |
| 2011/0311094 A1 * | 12/2011 | Herzog et al. | 382/100 |

* cited by examiner

*Primary Examiner* — Masud Ahmed

(57) ABSTRACT

A system and method for defining an augmented reality character in a computer game having multiple players uses a portable cellular communications device having a camera. Tags are used comprising patterns which are scanned by the camera and transmitted to a game server. The pattern is translated by the server into an augmented reality item, being either a person or a character. The augmented reality item is transmitted to the camera and displayed to the gamer transposed over the object upon which the tag is placed.

19 Claims, 18 Drawing Sheets

500

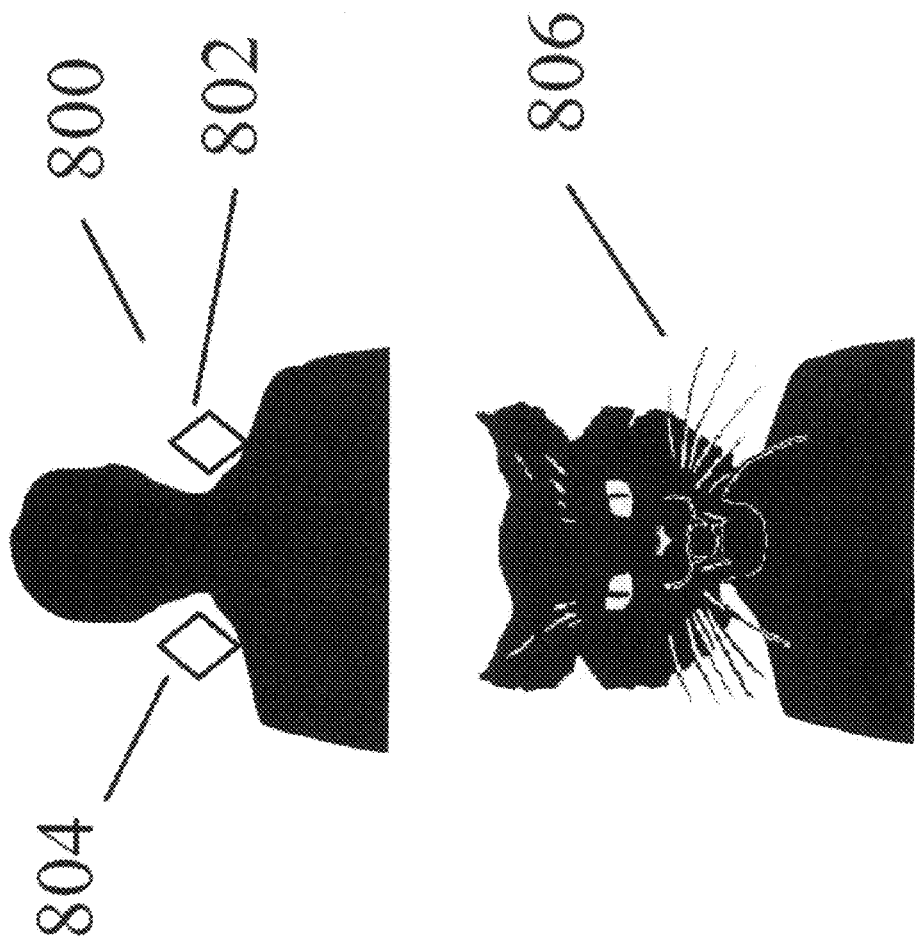

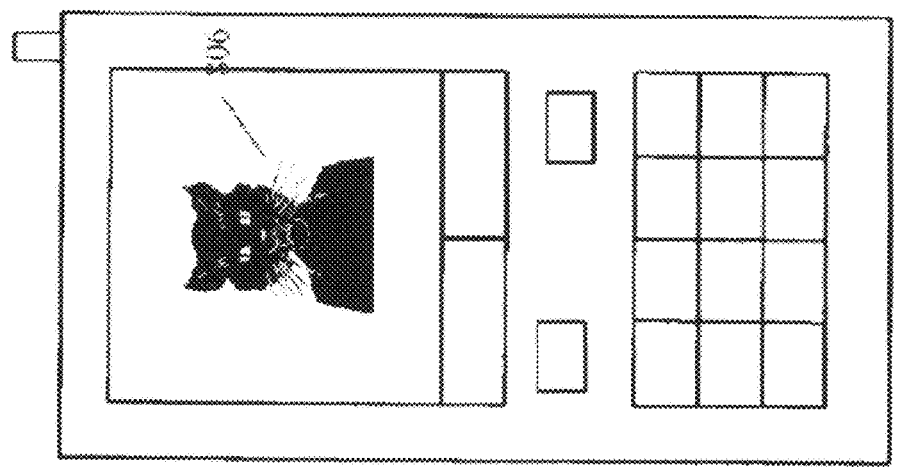
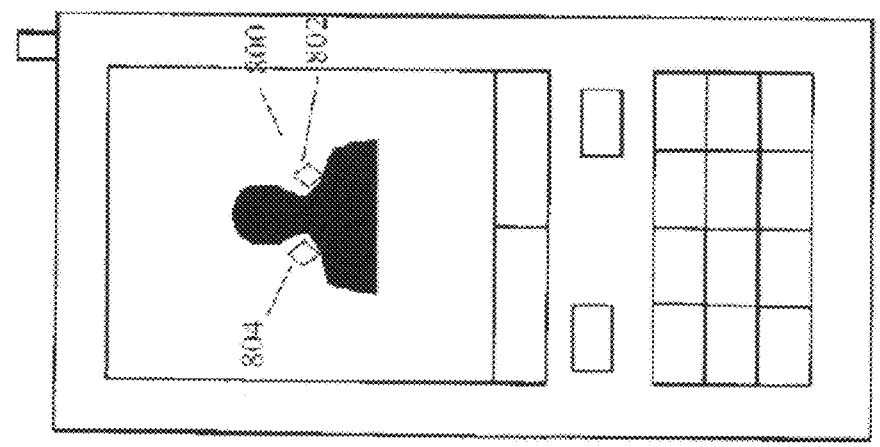
Figure 8A

SYSTEM AND METHOD FOR DEFINING AN AUGMENTED REALITY CHARACTER IN COMPUTER GENERATED VIRTUAL REALITY USING CODED STICKERS

CROSS-REFERENCE TO RELATED APPLICATIONS

This application claims the benefit of U.S. Provisional Patent Application No. 61/468,027 filed by the same inventor on Mar. 27, 2011.

FEDERAL SPONSORSHIP

N/A.

FIELD OF THE INVENTION

This invention relates to computerized virtual reality situations including computer games incorporating virtual reality as well as social networking applications such as dating networks. The invention further relates to using computer graphics processing and selective visual display systems and specifically a system and method for defining an augmented reality character in a computer generated virtual reality using coded stickers.

BACKGROUND OF THE INVENTION

Augmented reality (AR) is a term for a live direct or an indirect view of a physical, real-world environment whose elements are augmented by computer-generated sensory input, such as sound or graphics. It is related to a more general concept called mediated reality, in which a view of reality is modified by a computer. As a result, the technology functions by enhancing one's current perception of reality. By contrast, virtual reality replaces the real-world with a simulated one.

Augmentation is conventionally in real-time and in semantic context with environmental elements, such as sports scores on TV during a match. With the help of advanced AR technology (e.g. adding computer vision and object recognition) the information about the surrounding real world of the user becomes interactive and digitally manipulable. Artificial information about the environment and its objects can be overlaid on the real world.

Research explores the application of computer-generated imagery in live-video streams as a way to enhance the perception of the real world. AR technology includes head-mounted displays and virtual retinal displays for visualization purposes, and construction of controlled environments containing sensors and actuators.

As an example, AR technology can be incorporated into cell phones running on the ANDROID operating system as well as other operating systems such as iOS, PlayStation and VITA. AR has been incorporated into modem video games. AR has the ability to produce computer generated images in a user's real-world field of vision in real time.

The AR field is divided into two major areas from an algorithmic standpoint:
  marker-based
  positional-based
  object/feature recognition Marker-based augmented reality is based on the computer processing of artificial markers or tags in the real world (examples: QR codes, barcodes, or similar markers) and superimpose computer-generated images based on where the markers are located. Positional-based augmented reality is based on where you are located, where you are pointing to (as in heading), and where are the objects of interest are located relative to you. The computer then will superimpose images on top of the real-world image. Some applications are hybrids of these techniques.

Marker tags are small black and white printable shapes that interact with software downloaded to a computer equipped with a webcam or a smart phone with camera to create 3-D images overlaid on the real-world image seen on screen. The markers define spatial positioning and rotation of an object or character. Refer to FIG. 1 and FIG. 2 for an example of a marker and the AR image it produces.

Object/feature recognition and positional based processing is processing that is intensive and highly inaccurate. A marker based system allows secure identification of a person (as an example) with one active marker. Optical near range recognition will be possible even in dark or smoky environments such as a bar.

One problem associated with marker tags is that they must be visible and easily recognized for the camera to recognize and interpret. Another problem associated with visible marker tags is that the camera viewing the marker must be connected to an image processor powerful enough to interpret the marker and produce the AR layover. Current cell phone technology or portable data processing technology are currently powerful enough to operate image processing technologies such as cameras but lack sufficient power to project sophisticated AR images used in modern video games using AR applications such as role playing games in which players adopt the persona and visual appearance of a game character.

OBJECTS ADVANTAGES OF THE INVENTION

Accordingly, it is an object of the present invention to provide an improved marker for AR applications such as gaming and social networking.

Another object of the invention is to provide secure and active detection markers that are invisible to the human eye.

It is another object of the present invention to provide a system whereby handheld and portable computing devices having cameras and image processing technology such as cell phones and iPads can be used in AR enabled applications.

It is another object of the present invention to provide an unrecognizable marker that can be used in an AR gaming application so as to not be visible and visually recognized as an AR marker to game participants.

It is an additional object of the present invention to provide an unrecognizable marker than can be viewed by a hand held image processor and interpreted without a large amount of processor power.

Another object of the invention is to enhance tag recognition while reducing processing power.

It is a further object of the invention to provide a method for defining an AR character in a computer AR application such as a game using coded stickers.

Additional objects, advantages and novel features of the invention will be set forth in part of the description which follows, and in part will become apparent to those skilled in the art upon examination of the following specification.

BRIEF DESCRIPTION OF THE DRAWINGS

FIG. 8 illustrates the use of two tags to superimpose an AR image over a real image.

FIG. 8A illustrates how the images may appear on a portable cellular phone with screen.

DESCRIPTION OF THE INVENTION

The following description of the present invention is merely exemplary in nature and not intended to limit the invention or the application or uses of the invention.

Figure 1:
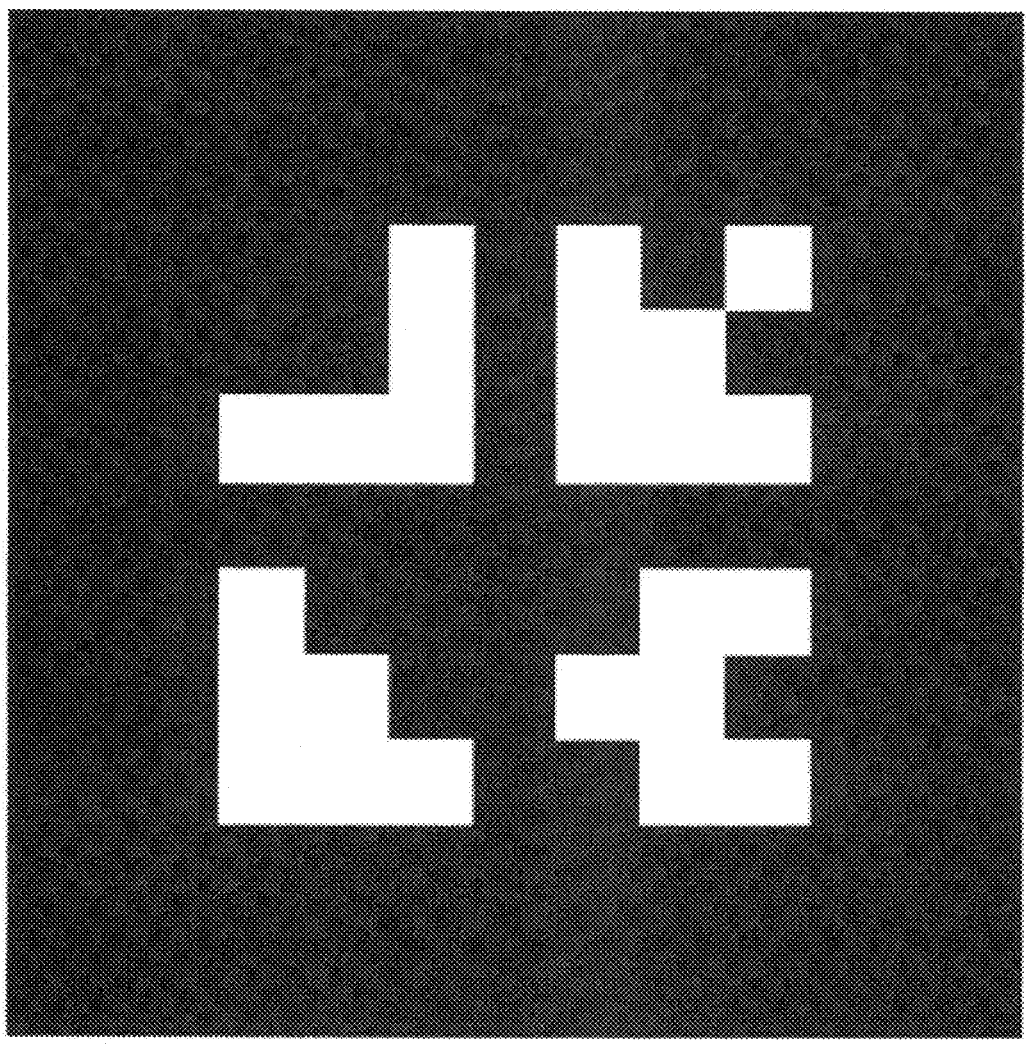
FIG. 1 illustrates a prior art marker.
Figure 2:
FIG. 2 illustrates an AR image generated by a prior art marker.
Figure 3:
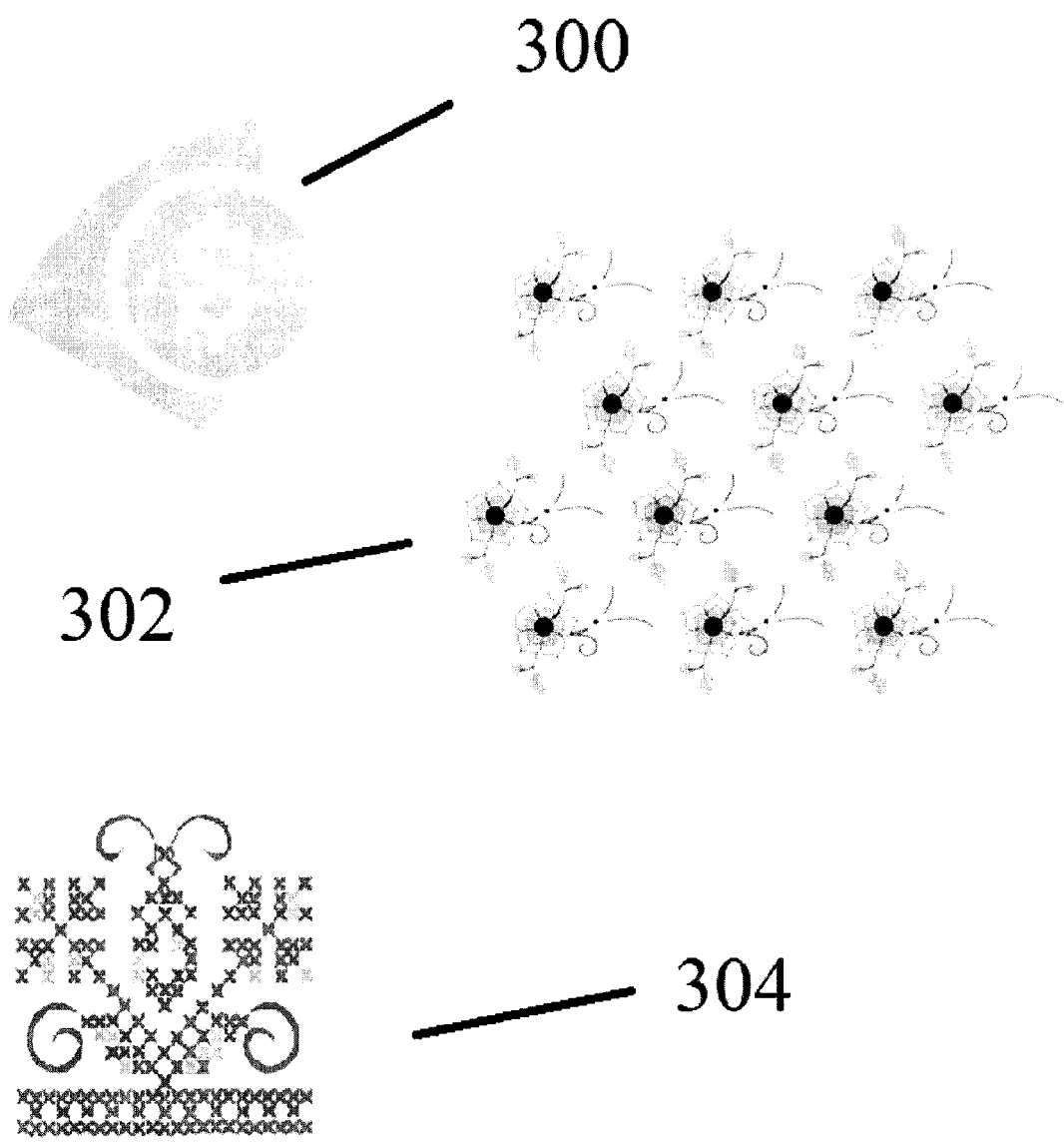
FIG. 3 illustrates three embodiments of patterns that can be used by the invention.
Figure 4:
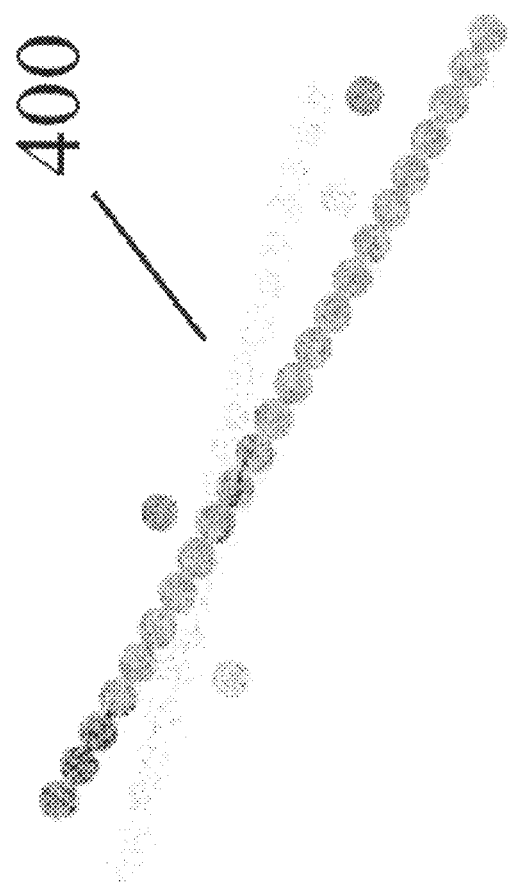
FIG. 4 illustrates a string of tags that may be purchased by a gamer as an aftermarket item.

Referring to FIG. 3, the invention relies on the use of coded markers that are simple in nature and unrecognizable by the human eye. The tags may be visible in the real world but they do not resemble prior art markers. In one embodiment of the invention, the coded markers may be in the form of stickers that can be purchased for an AR application such as a game as an accessory. In another embodiment of the invention, the stickers can be downloaded from a provider's website. The stickers carry a coded design that is invisible or generally not recognizable as a typical AR marker. In one embodiment of the invention, the code may be a logo, a graphic or some other visual cue (300, 302, and 304). Item (300) may be a logo sewn to a hat or jacket. Item (302) may be a black and white pattern on a surface that is recognizable by a camera. The stickers can be sold as a strip of stickers as an aftermarket item in convenience stores or gaming stores and adapted to any AR application using coded stickers. One example of a strip of stickers is shown in FIG. 4, item (400).

Figure 5:
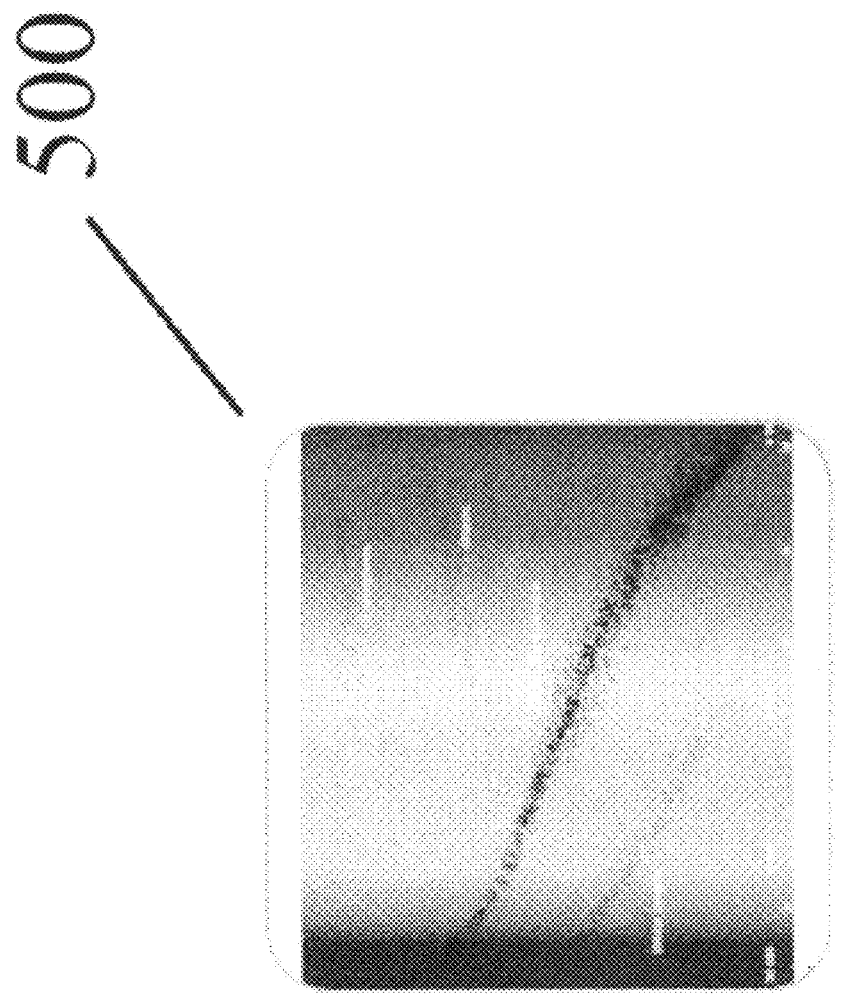
FIG. 5 illustrates one sample of a reflective tag used in one embodiment of the invention.

To overcome prior art problems associated with tag and pattern detection in less than optimal lighting conditions using handheld devices having weak image resolution characteristics one embodiment of the invention includes tags having specialized colours to enhance their detectability. For example, a tag and encoded pattern may reflect optimally when exposed to a camera flash or even a handheld flash light as shown in FIG. 5, item (500) which depicts a pattern having reflective patterns recognizable by a camera in lower light conditions.

Figure 5A:
FIG. 5A illustrates one example of a low light situation in a social networking environment.
Figure 5B:
FIG. 5B illustrates one embodiment of the invention in use in a low light environment.
Figure 5C:
FIG. 5C illustrates the same embodiment as FIG. 5B enlarged.

For example, in FIG. 5A there is shown a social networking situation in a location where ambient light typically low. Referring to FIGS. 5A and 5B and by applying the coded tags of our invention social networking information is reviewed using a hand-held device such as a cellular telephone.

Figure 6:
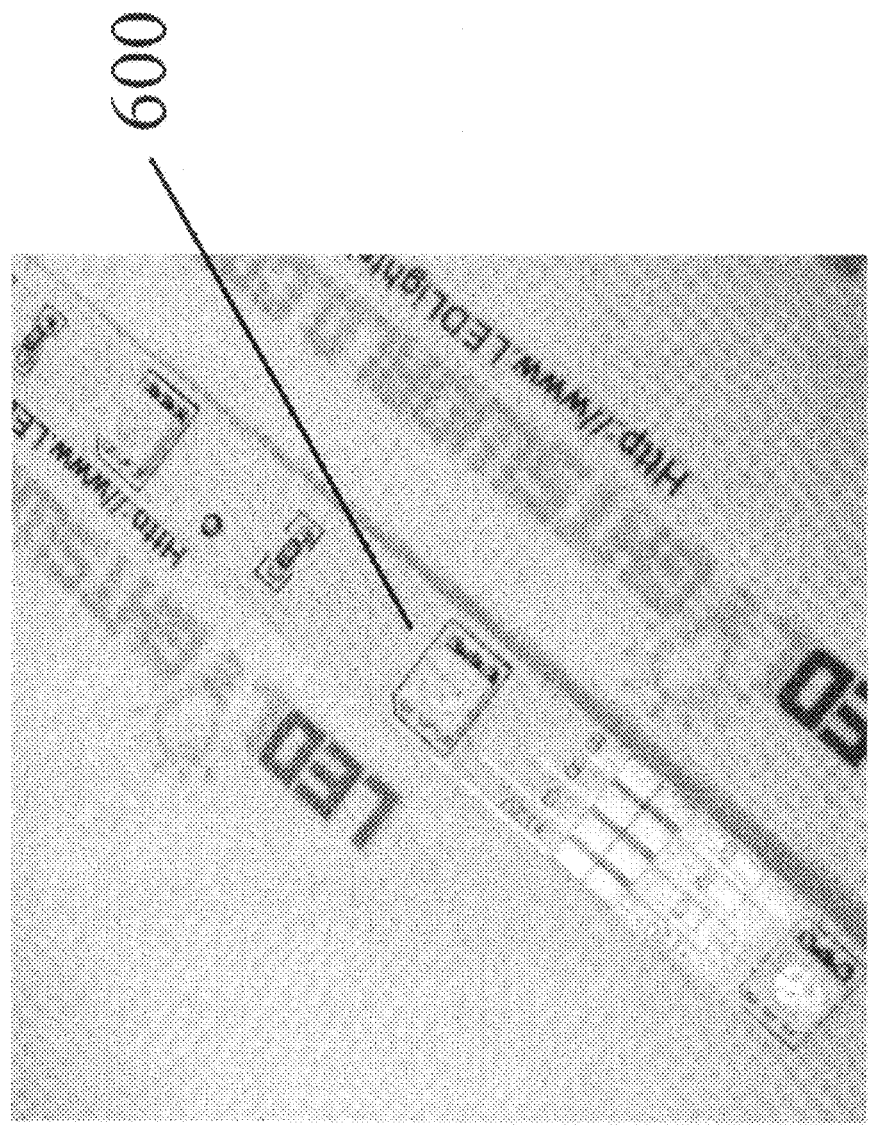
FIG. 6 illustrates one example of an infrared emitting LED used in one embodiment of the invention.
Figure 7:
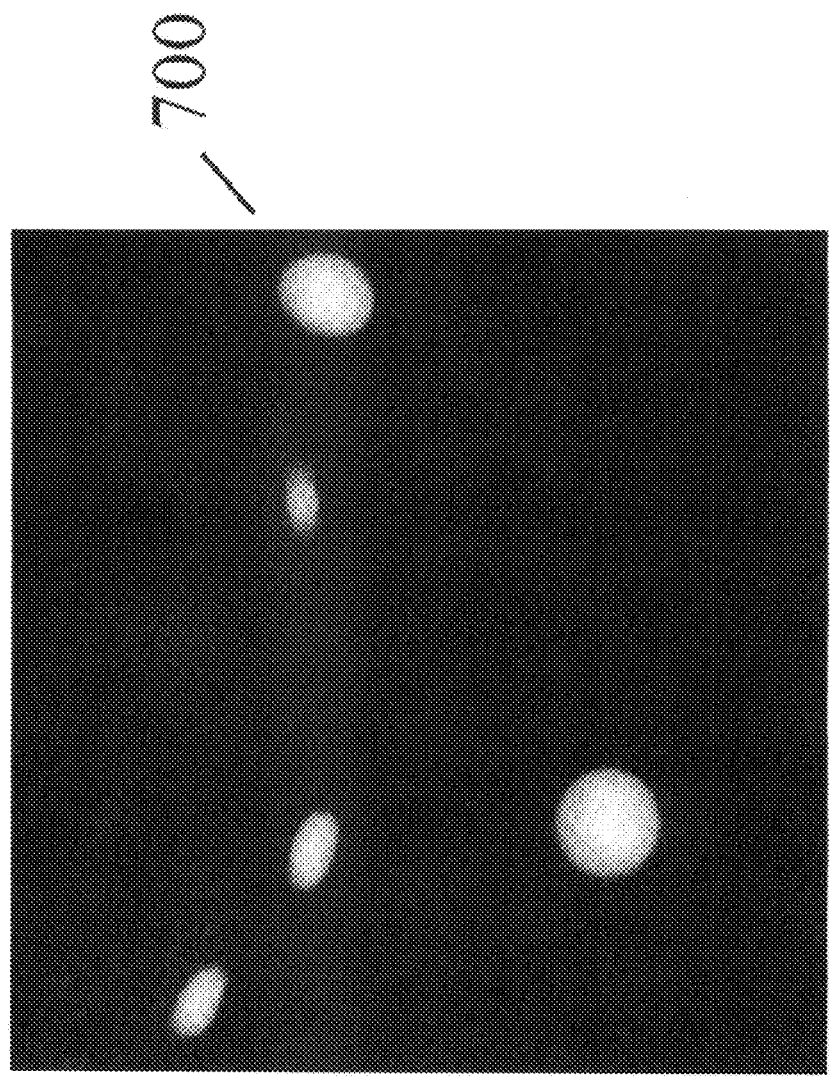
FIG. 7 illustrates the use of infrared LEDs as pattern generators in one embodiment of the invention.

Another way that this invention can overcome the detection and processing limitations of cameras in mobile devices the system of this invention can use active tags instead of passive tags that rely upon passive pattern recognition and require adequate processing power to interpret the pattern. Active tags will remain invisible to the human eye but detectable by scanning devices such as portable cameras with limited processing power. Such tags may use IR light emitted by IR LEDs (FIG. 6, Item 600). Although the emitted light is not visible to the human eye, a portable camera will be able to easily detect the IR emission even in situations where is there is no ambient light. This will enhance game playing enjoyment as the game may be able to be played at night outside or inside where ambient light is low. The IR LED will be detectable by the camera as a glow as shown in FIG. 7, (700). The active tag IR LED will be mounted to a small adhesive patch or sticker and include a small programmable processing unit. The IR enabled tag will be able to be purchased at a retail outlet and can adhere to any surface. The active tags will be registered with the central server database so that an active pattern can be identified and matched to an AR image. For example, the IR LED may emit light pulsing at a predetermined frequency. This frequency will be registered to an AR image. As well, active tags can be used in multiples like passive tags. The recognition of a single active tag matched to other active tags will result in pattern recognition and processing using significantly less power than having to scan, detect and process three separate active tags. The matched tags can be registered in the central server as a single set of tags and sold as a set with instructions for placement so that the mobile detector can easily find them. Multiple IR LEDs can be used to form geometric patterns on a single tag. Geometric patterns can be combined with pulsing LEDs to create a large variety of detectable codes that would be stored in the central database. Generally, the use of active tags will reduce the amount of processing power required to detect the tags and increase the accuracy of tag detection and interpretation.

Active tags can also be used in other low ambient light situations. For example, payment of a bridge toll by a portable cellular phone can be enhanced by using a pattern of IR LEDs recognizable by a central server.

The stickers can be placed anywhere in the real world. In one embodiment of the invention the sticker can be used to increase the amount of virtual wealth of a player of an AR game. For example, a sticker may be affixed to a real world object such as a fire-hydrant. The game player would search for or be guided to the real world object by playing the game on a portable device such as a portable cell phone. Once identified, the portable cell phone can scan the object and identify the sticker as an object of virtual wealth for the game being played.

Referring to FIG. 8 and FIG. 8A and in another embodiment of the invention, the stickers (802) and (804) may be placed on the shoulders of a game player (800) to bracket the head of the player. The stickers may be coded to generate a virtual image of a game character (806) in a roll playing game. When an individual is viewed through a cell phone camera, a virtual image of the game character is displayed over the real world face of the game player. The stickers would also ensure spatial and rotational congruence between the AR generated image and the real world head of the player.

Figure 9:
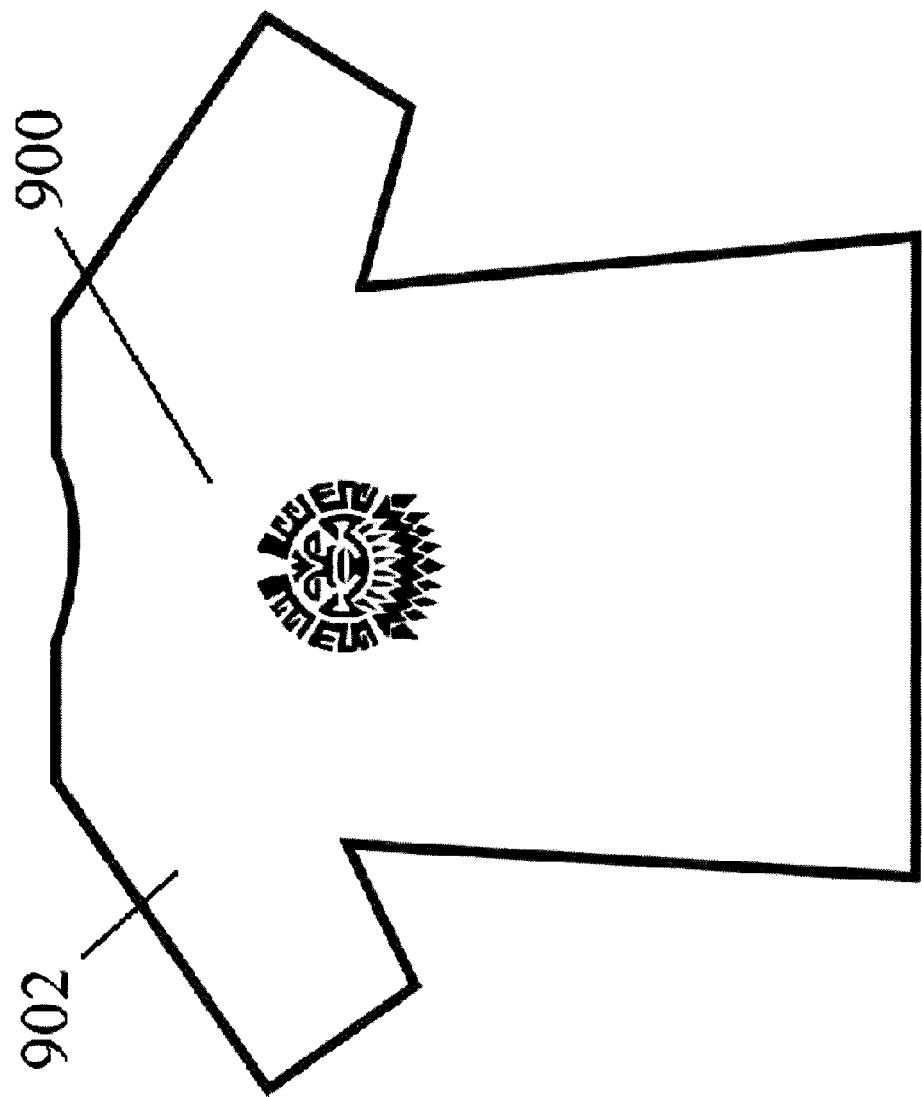
FIG. 9 illustrates the use of a tag sewn onto an article of clothing in one embodiment of the invention.

Referring to FIG. 9 and in one embodiment of the invention, the unrecognizable marker (900) may be sewn into a garment of clothing (902) of a game player as a pattern that can only be recognized by imaging and processing.

Enhanced tag recognition can be accomplished using portable computing devices by using multiple tags. In this embodiment of the invention three tags (or more) can be used. The tags are coded and matched to each other and registered as coded and matched in the game database. The camera on the portable device is only required to recognize one tag. Since the other two tags are matched to the recognized tag the system is able process all three tags based only on the one recognized tag. Therefore, multiple tag detection and processing are independent of the power, detection quality and speed of the portable device.

Figure 10:
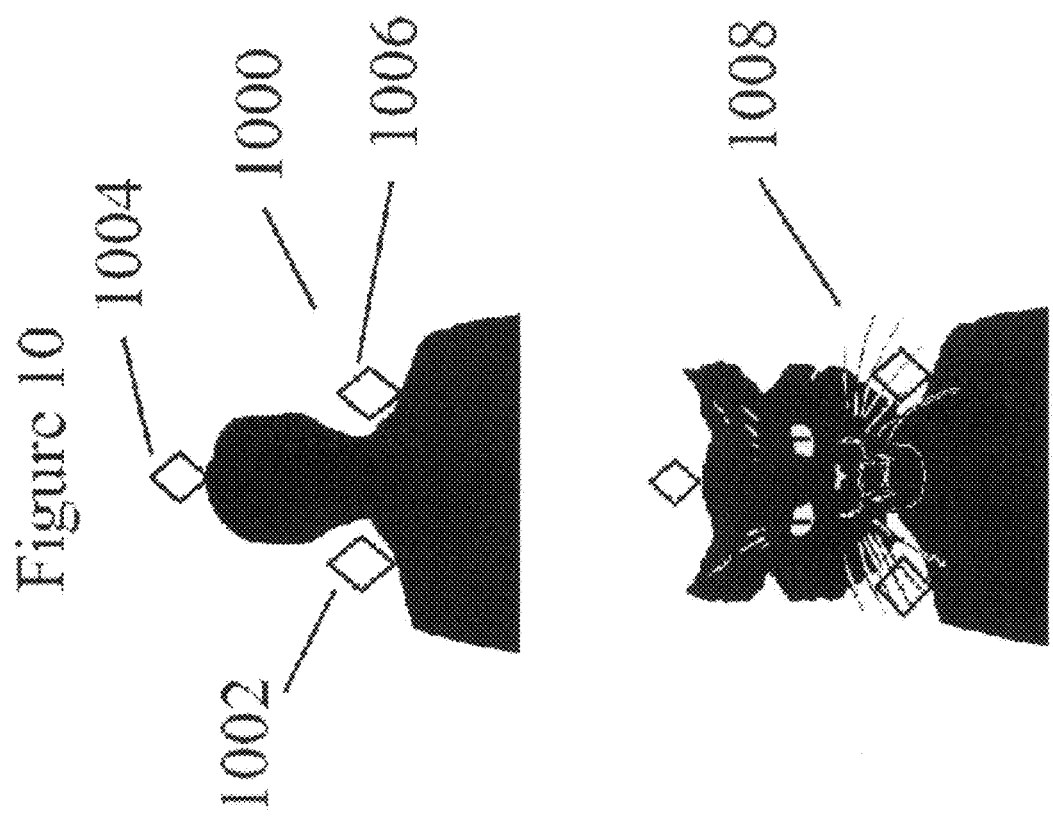
FIG. 10 illustrates the use of three tags to superimpose an augmented reality identity of a gamer in one embodiment of the invention.

Referring to FIG. 10, and in another embodiment of the invention, the tags that are purchased by the game player come with instructions explaining multiple tag placements. For example, if three tags (1002, 1004, and 1006) are placed on a player's body (head and left and right shoulders) (1000) so that an AR image (1008) is superimposed over the player's head, then the portable computing device need only recognize one of the three tags. The other two tags are coded as associated with the detected tag. The system will then know that there are two other associated tags and can create and position the AR image properly without having to process all three tags. This use of "smart tagging" is an improvement over the prior art tagging systems which rely upon the detection device being able to scan the entire image in order to find the tags and then process all three to create the AR image. The smart tags are registered on a central server database so that the portable scanning and detection device needs only to query the database for the correct image. The central server possesses the power to process the proper image and send it for display on the portable device.

Figure 11:
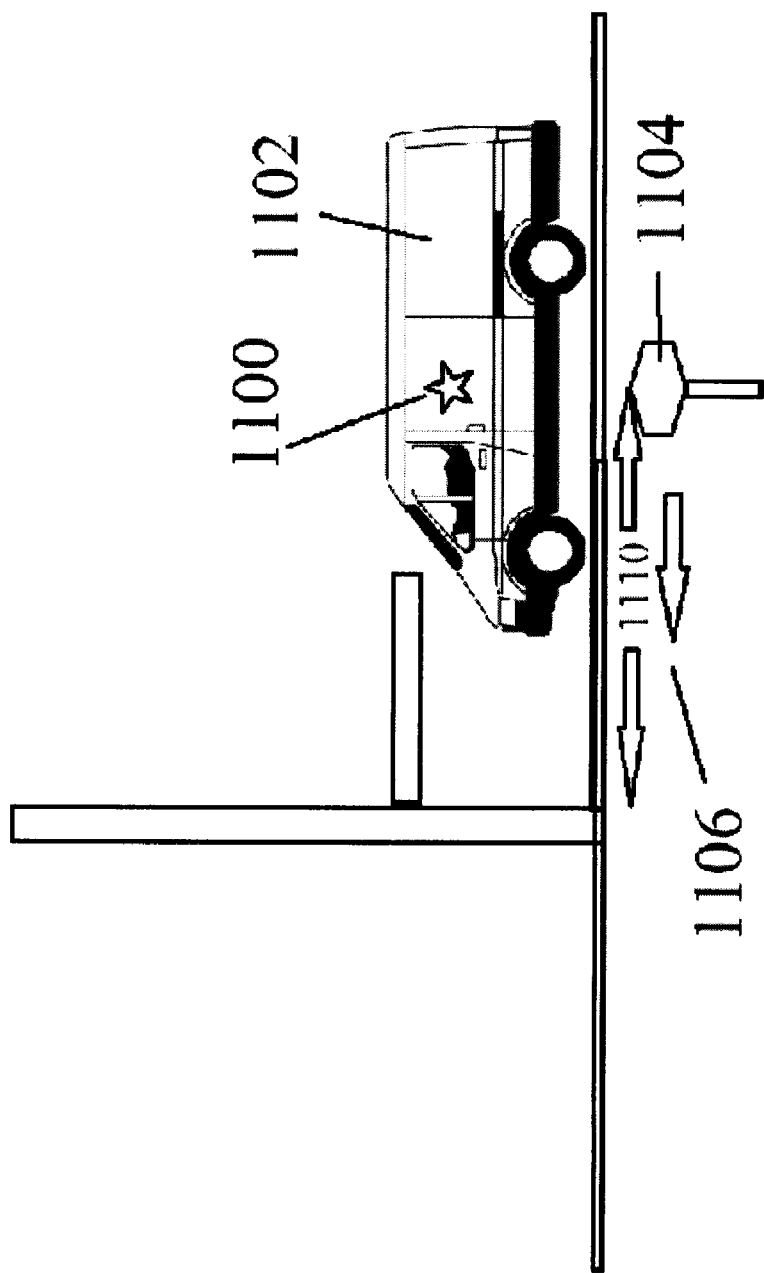
FIG. 11 illustrates the use of a tag of one embodiment of the invention in a toll booth.

Referring to FIG. 11 and in another embodiment of the invention the active tags can also be used in other low ambient light situations. For example, payment of a bridge toll or road toll or parking fee by a portable cellular phone can be enhanced by using a pattern of IR LEDs recognizable by a central server. The active IR tag such as an IR LED emitter (1100) can be secured to a vehicle (1102). The toll payment system tag detector (1104) can easily recognize the vehicle holder's name from the code emitted by the tag (1100). Payment information can be transmitted over a cellular telephone network (1106) to an authority. When payment is confirmed the barrier (1108) is opened. This takes places very quickly so that the vehicle does not have to stop. The detector (1104) is located a distance (1110) which is enough away from the barrier (1108) to allow payment processing time so that by the time the vehicle arrives at the gate it is already open. This is a far superior method than attempting to view and scan by optical recognition means or photograph a license plate. However when a car uses this embodiment of the invention the cameras can easily detect the pulsing light code or pattern even at night and probably fog since IR light is able to go through fog. The tolling system would create more revenue by catching more drivers around the clock. It is also an energy saving mechanism as the vehicle traffic is not impeded by stop and go motion caused by the toll gate.

Figure 12:
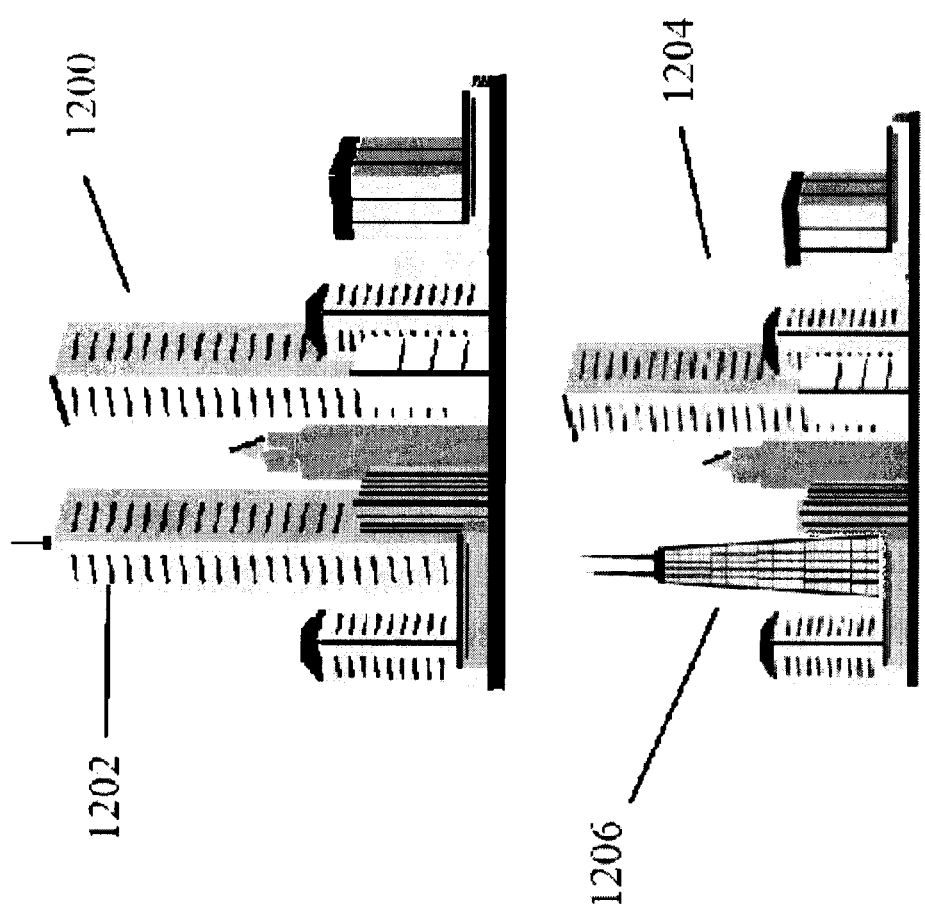
FIG. 12 illustrates the use of a tag on one embodiment of the invention to substitute a real building for an augmented reality building.

Referring to FIG. 12 and in a further embodiment of the invention, a game may require that a real world building (1202) in a city (1200) be replaced by an AR building (1206) creating a different city scape (1204). An unrecognizable sticker can be attached to the building by one player and then other players can locate and identify the building. The building can then by replaced by an AR generated building for game use. The central server may contain GPS data. A database query from a portable scanning and detection device containing GPS data will permit the central server to generate AR images particular to the location of the detection device. For example, if a building is tagged with an AR marker the central server can identify the building by its GPS coordinates and then process an appropriate AR image for that building.

Figure 13:
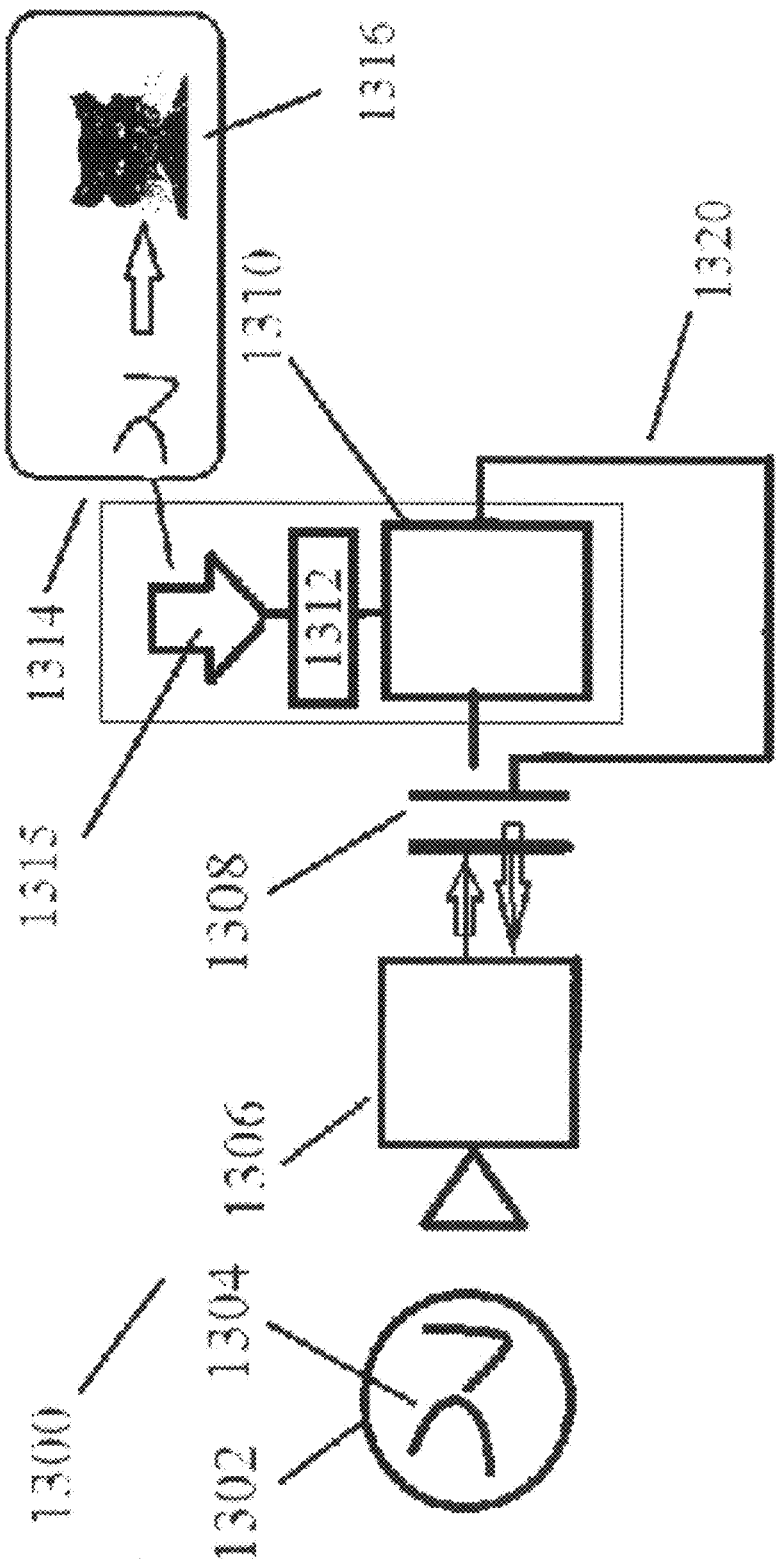
FIG. 13 represents a schematic of one embodiment of the system of the invention.

In order to overcome the shortcomings associated with the limited processing power and storage capacity of portable cell phones and computer devices, one embodiment of the present invention may have the architecture shown schematically in FIG. 13.

The tag (1302) is placed upon a real game player or a real game object. The tag (1302) has a human-unrecognizable pattern (1304). The tag and pattern are scanned by the camera (1306) which may be a portable camera connected to a cellular telephone. The camera (1306) is connected over a wireless communications system (1308) to a central server (1310) for the particular game being played. Since the camera device (1306) has limited processing power, the ability to outsource processing to a game central server (1310) provides faster results. The central server comprises a computer processor (1312), image processing software (1315) and an image database (1314). The central game server (1310) processor (1312) receives the digitized image data from the camera and decodes the received pattern into an AR image code (1316). The image code (1316) received from the camera is then compared to images stored within database (1314). The code is then identified with an AR character or an AR virtual asset which is sent (1320) back to the camera (1306) by the wireless communications network (1308) and displayed on the camera (1306) screen over the tagged real image. The AR image will be proportioned appropriately to fit over the tagged real world object as illustrated in FIG. 8.

In one embodiment of the invention, there is a registration process whereby game players will register on-line with the central game server administrator. By undergoing a registration the players will be able to play an AR augmented game outside of the confines of a home terminal or some other stationery terminal. Game players would log into the server and select their game which may already be in progress. The game could continue to be played in an expanded real world setting using portable devices such as cell phones. Real world objects could be used as AR wealth assets and collected as part of the game. The processing power of a centralized server would permit the integration of a GPS system to locate and define AR wealth assets as well as process and store the collection of assets.

To overcome any detection issues with current and future mobile devices and their camera system, active tags, as described above, may be used instead of passive tags that only rely on passive recognition (decipher a pattern). Active Tags will help in reducing the processing power needed to detect tags even in the worst lighting conditions and situation. Active Tags will be still invisible to the human eye and so they will not be distracting to the surrounding environment of people. However they will be clearly visible to the camera of a mobile device. By using IR light created by Infrared LED's not visible to the human eye; mobile devices can easily detect and see this light even in pitch black situations. This will allow the invention to detect a player even at night or dawn or in a bar where light conditions are not great.

All these active tags will be registered into the game database exactly like the passive tags. Every tag used in the game will be registered with its pattern (light pulses in this case). A player can design his or her own tags and these can be registered into the game tag database. Light pulsing stickers can be registered in the database as one group and along with detailed instructions of how to use them.

In another embodiment of the invention, the central server game database will be able to predict what tags are potentially in use in a particular geographical area. The central server database will have all known tags that are registered and in use. These tags will include registered active and passive tags that are pattern based as well as registered tags by geographical region. Using GPS data is possible to identify what tags are registered in a particular region. The portable scanning device will be identified by its own GPS coordinates. The central server database will only present those tags that are registered in the same GPS identified location. This further reduces the amount of processing power necessary to scan and interpret patterns since the processor does not have to compare the detected tag with all registered tags. Only those tags in use in a particular area need to be compared with the detected tags. This will also reduce significantly the number of false positive detections.

This database itself defines the recognition method for each tag or game that is played. If multiple (grouped/matched) tags are needed to define an AR object the centralized database exactly knows which tags define an object or position of an AR object.

In yet another embodiment of the invention a passive tag may be enhanced with IR reflective color to reveal the recognizable pattern only to a mobile camera device and not to the human eye. An IR flashlight can be used to identify the passive tag and enhance the reflectivity from the tag to improve symbol detection by the portable device and interpretation by the central server. IR flashlights may be sold with IR tag sets so that the passive tag is a "Tool Assisted Tag".

The Tool Assisted Tag may be incorporated into an AR game wherein a higher player status is achieved by possessing an IR detection device in the form of a "Wand" or "Gun". The wand is an IR flash light or IR strobe light that will allow the higher status player to shoot (point) at a lower status player to detect hidden IR tags. Detection of the tag may result in the lower status player being deemed "dead" or "incapacitated" and this player status being recorded in the central server database. The higher status player will be able to obtain additional points from identifying and incapacitating the tagged player. This player as "dead" or frozen in the database and assign points to the shooting player. The IR Wand or Gun may be sold with the IR tags or with a game.

With the use of IR light, it is possible to use IR reflective paint to mark persons or items for detection. For example, a player may be able to use IR reflective paint to create a random tag instead of an adhesive tag that is pre-registered with the central database. A non-toxic paint may be sold with the IR Wand. The randomly tagged player can register the random tag on the central server database where it is analyzed and stored. The random tag is either associated with an AR object or with the identity of the individual.

The tag is also used in a computer game to identify the player in the gaming database and the status in the player, for example, the power and achievements of the player. The tags are also used as marker for position and orientation in space of AR objects that are superimpose as 3D objects on real world objects. For example, tags placed on a player's body will permit easy identification of a hand or head or shoulders by the data processor in the central server. The more predefined functionality in the database the less the mobile device needs to process and calculate.

The tagging technology described above can also be used in a wide variety of military and commercial application such as surveillance where object identification is required. Emergency responders can also use the tagging of this invention to mark buildings as previously searched for survivors, condemned or dangerous after an earthquake.

Figure 14:
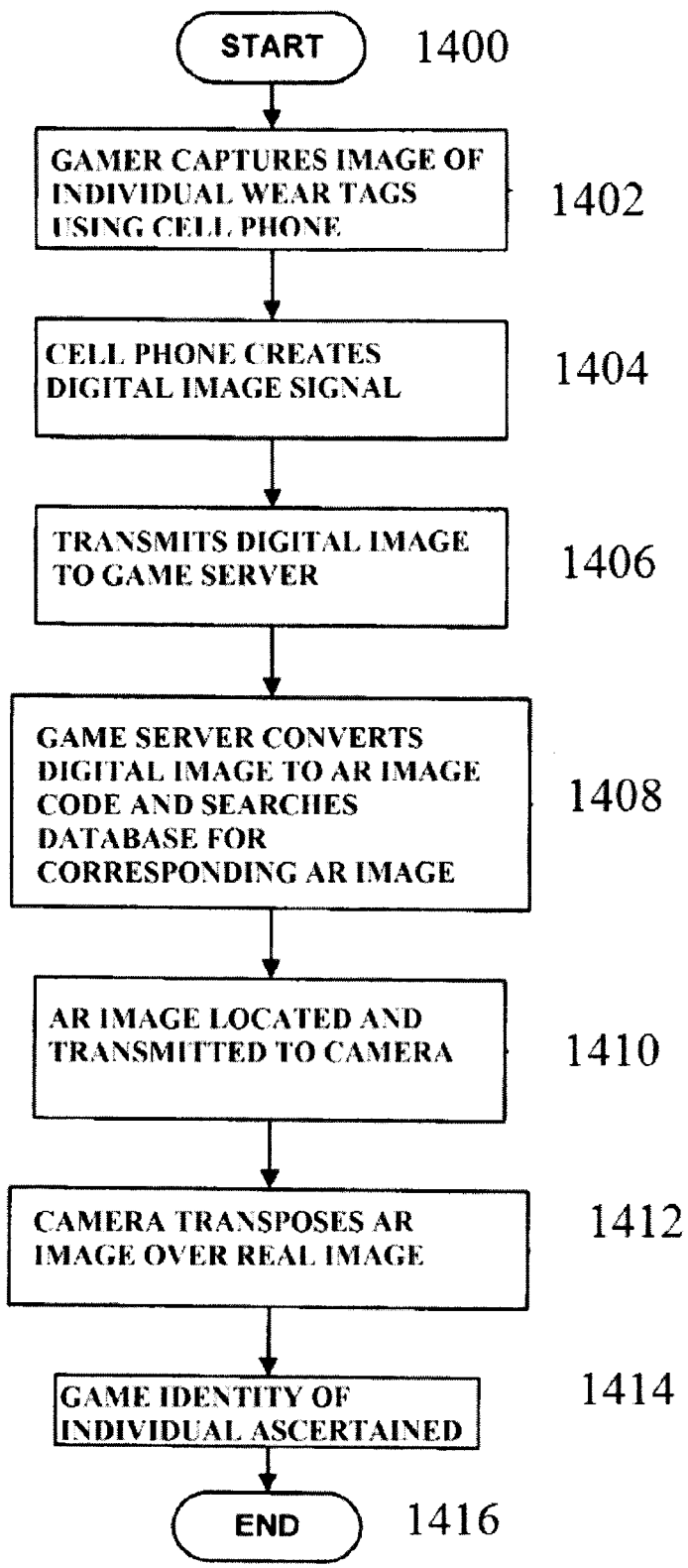
FIG. 14 is a flow diagram of steps on one method of the invention.

FIG. 14 illustrates one method the invention as to how one gamer may identify another gamer using the invention:

In step 1402 the first gamer captures the image of the second gamer wearing tags using a cell phone. In step 1404 the cell phone creates a digital image of the second gamer. In step 1406 the camera transmits the image to the central game server. In step 1408 the game server converts the digital image received from the camera into an augmented reality (AR) image code and searches the database for a corresponding AR image. At step 1410 the server locates the corresponding AR image and transmits the image to the camera. At step 1412 the camera transposes the AR image over the real image. At step 1414 the game identity of the second game player is identified.

What is claimed is:

1. A system for defining an augmented reality item in a computer game having at least one gamer, said system comprising:
   a. A portable camera having a wireless transmitter and capable of detecting;
   b. At least one tag comprising a pattern readable by said portable camera and indecipherable wherein the camera forms a digital pattern signal for transmission by said wireless transmitter over a wireless network;
   c. A game server comprising a wireless receiver for receiving said pattern signal over said wireless network;
   d. A computer processor connected to said game server for receiving the digital pattern signal from said game server;
   e. A software program executed by said computer processor for converting the digital pattern signal into an AR image code; and,
   f. A searchable database connected to the computer processor and containing a plurality of AR image codes corresponding to a plurality of digital pattern signals representing a plurality of AR items;
   g. Wherein the computer processor searches said database for said AR image code stored within the database, locates an AR item corresponding to the AR image code, and transmits an AR item signal to the portable camera wherein it is displayed to said at least one gamer;
   wherein the AR item comprises the placement of at least three tags on a game object and wherein said at least three tags are coded and matched to each other the database of AR items, so that the camera detection of a single tag of the at least three tags results in the game server processing the at least three tags thereby generating the AR item signal to the camera.

2. The system of claim 1 wherein the portable camera is integral with a cellular telephone and wherein said wireless transmitter is said cellular telephone.

3. The system of claim 2 wherein said wireless network is a cellular telephone network.

4. The system of claim 1 wherein the pattern is one of a passive pattern and an active pattern.

5. The system of claim 4 wherein said passive pattern is detectable by the portable camera under a condition of ambient light.

6. The system of claim 4 wherein the active pattern comprises a pattern of infrared light emitted by an at least one infrared emitter fixed to the at least one tag.

7. The system of claim 1 wherein the pattern is derived from a tool assisted tag.

8. The system of claim 7 wherein the pattern comprises a quantity of IR reflective paint and said tool is an IR flashlight or an IR strobe light.

9. The system of claim 6 wherein said at least one infrared emitter comprises an infrared emitting LED.

10. The system of claim 1 wherein the AR item is one of an AR character or an AR asset.

11. The system of claim 1 wherein the at least one tag is invisible to said at least one gamer.

12. The system of claim 1 wherein the pattern is programmable by the at least one gamer and wherein the at least one gamer stores said programmable pattern in the database.

13. The system of claim 1 further including a GPS receiving device connected to the cellular telephone which identifies a geographical location of the gamer and transmits said geographical location as a set of GPS telephone coordinates to the game server.

14. The system of claim 13 wherein a plurality of tags are deployed in the game and wherein the database further includes GPS coordinates of said plurality of tags so that upon receipt of a set of GPS telephone coordinates the server transmits to the gamer the location of a subset of the plurality of deployed game tags comprising tags within a predetermined proximity to the set of GPS telephone coordinates.

15. The system of claim 14 wherein the tags comprise a second subset of tags identified by a gamer name and a gamer AR item and a corresponding game achievement level so that when one of said second plurality of tags is detected by the camera of a co-gamer the database will transmit to the co-gamer camera said gamer name and display said gamer AR item and said corresponding game achievement level.

16. A method for a computer game defining an augmented reality item, wherein said computer game is played by at least one gamer, said method comprising the following steps:
  a. Deploying a plurality of game tags comprising a respective plurality of patterns;
  b. Connecting a game server to a wireless communications network, wherein said game server comprises a computer processor, a database of AR items and a software program;
  c. Using a portable camera having a wireless transmitter connected to said wireless communications network, detecting at least one tag of said plurality of game tags;
  d. Using said portable camera scanning a corresponding pattern disposed on said at least one tag;
  e. Using the portable camera creating a digital pattern signal;
  f. Transmitting said digital pattern signal over said wireless communications network to said game server;
  g. Using said software program converting the digital pattern signal into an AR image code; and
  h. Using the software program, searching said AR image database and finding an AR image corresponding to said AR image code;
  i. Transmitting said AR image to the portable camera; and,
  j. Transposing the AR image over a camera view of the detected at least one tag; wherein the AR item comprises the placement of at least three tags on a game object and wherein said at least three tags are coded and matched to each other the database of AR items, so that the camera detection of a single tag of the at least three tags results in the game server processing the at least three tags thereby generating the AR item signal to the camera.

17. The method of claim 16 further comprising the step of using an LED IR emitter disposed on the game tag for emitting the pattern.

18. The method of claim 16 further comprising the step of populating the database with a first dataset comprising a set of GPS coordinates for every tag of the plurality of deployed tags.

19. The method of claim 16 further comprising the step of populating the database with a second dataset comprising an identity of said at least one gamer, an AR item corresponding to the at least one gamer and a corresponding game achievement level of the at least one gamer.

* * * * *